United States Patent
Lynam et al.

(10) Patent No.: US 6,196,567 B1
(45) Date of Patent: Mar. 6, 2001

(54) FOLDING BASE FOR A KICK STAND

(76) Inventors: Donald Kirk Lynam, 5919 S. Ridgewood Ave., Port Orange, FL (US) 32127; James McMullen, 154 5th St., Holly Hill, FL (US) 32117

( * ) Notice: Subject to any disclaimer, the term of this patent is extended or adjusted under 35 U.S.C. 154(b) by 0 days.

(21) Appl. No.: 09/257,886

(22) Filed: Feb. 25, 1999

Related U.S. Application Data

(60) Provisional application No. 60/076,329, filed on Feb. 27, 1998.

(51) Int. Cl.[7] ................................................ B62H 15/00
(52) U.S. Cl. ........................................ 280/288.4; 280/293
(58) Field of Search ................................. 280/293, 301, 280/288.4, 298, 304, 297, 300; 248/346.01, 346.07; 416/72, 73 C, 228, 235, 236 R, 237

(56) References Cited

U.S. PATENT DOCUMENTS

| | | | |
|---|---|---|---|
| 2,828,068 | * 3/1958 | Torluemke | ................. 416/73 |
| 3,151,662 | * 10/1964 | Fait | ........................ 160/32 |
| 4,046,397 | * 9/1977 | Kitrell | ................. 280/288.4 |
| 5,351,981 | * 10/1994 | Thomas | ................. 280/301 |

* cited by examiner

Primary Examiner—Kevin Hurley
Assistant Examiner—Andrew J. Fischer
(74) Attorney, Agent, or Firm—Paul S. Rooy

(57) ABSTRACT

A folding base for a kick stand comprising a stack of panels disposed within a housing. The panels are rotatably attached to the housing by means of a spindle, and may alternately be fanned out into an extended position, or retracted into the housing for storage and/or transportation. The housing comprises an upper deck sized to accommodate a kick stand foot of a two-wheeled vehicle kick stand. When extended, the folding base for a kick stand provides a secure base to prevent the kick stand foot from sinking into soft surfaces such as mud, grass, sand, etc., thereby preventing the two-wheeled vehicle such as a motorcycle or bicycle from toppling over and possibly being damaged or hurting someone. The kick stand foot is securely held in place on the housing upper deck by means of a clip and upper deck walls. Due to the resilient nature of the clip, the folding base for a kick stand may be quickly and easily installed and removed from the kick stand.

10 Claims, 4 Drawing Sheets

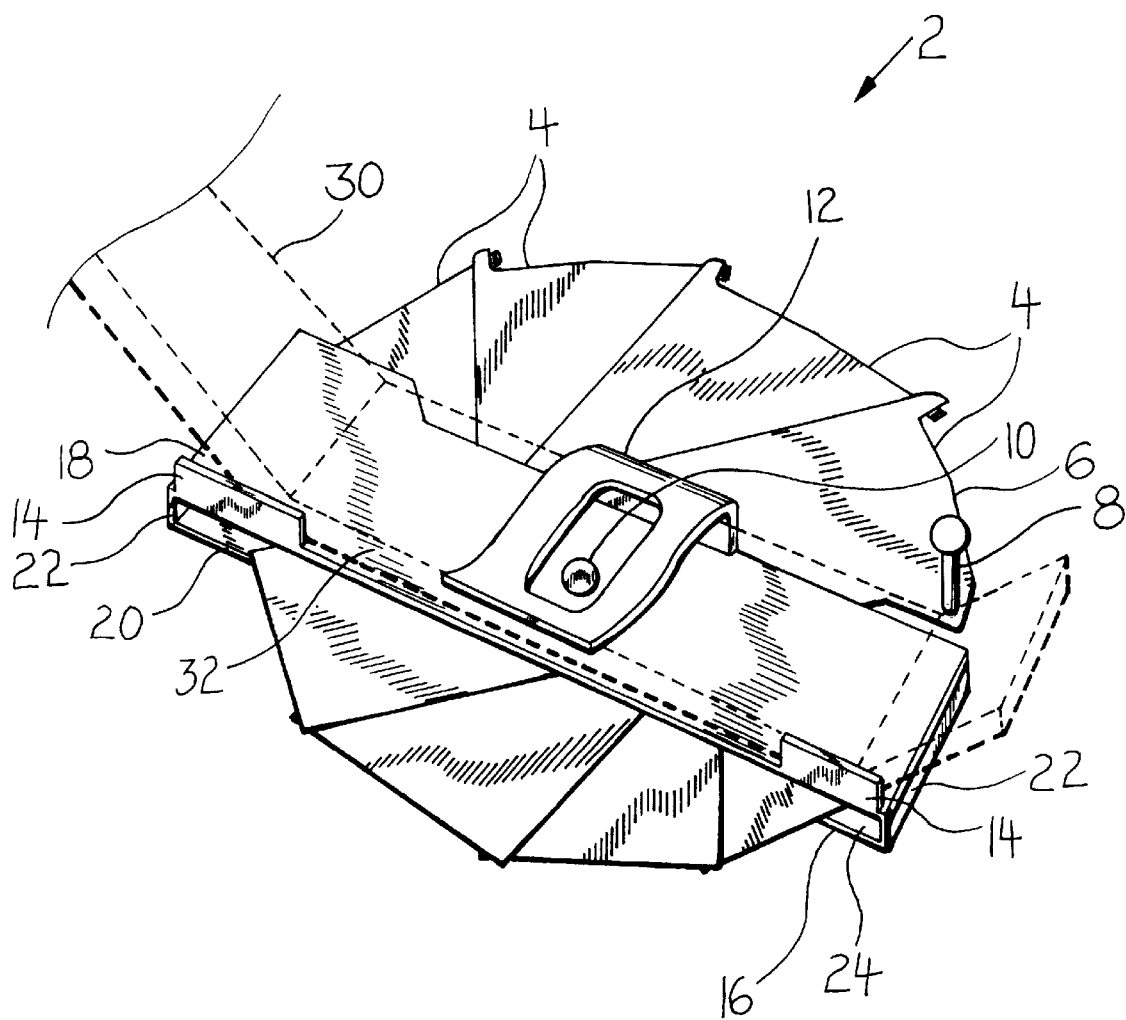

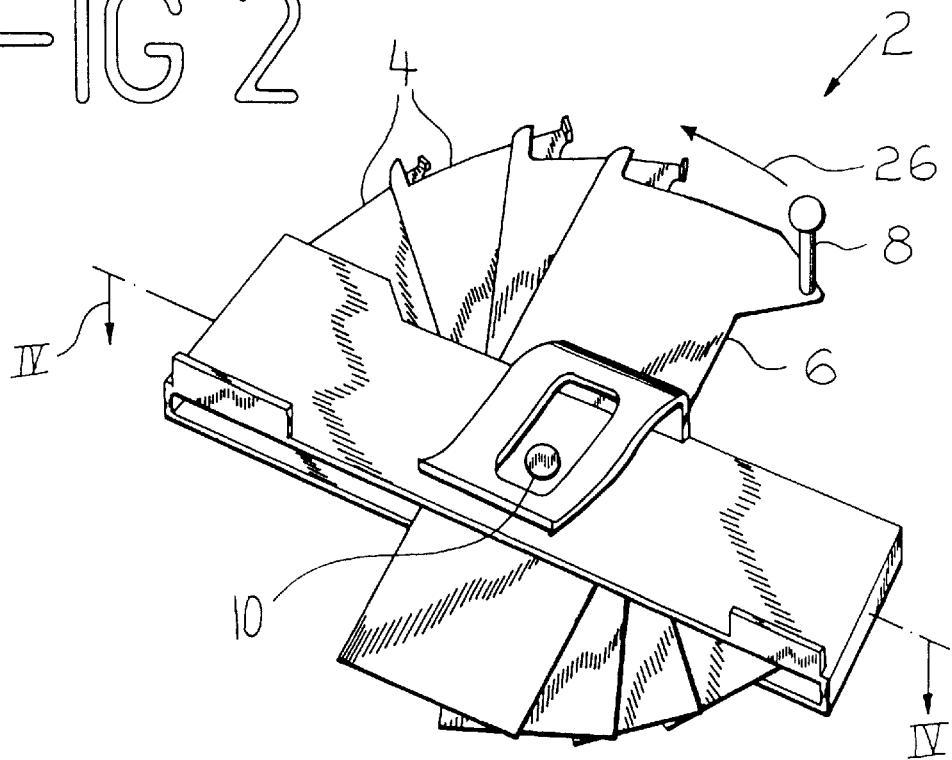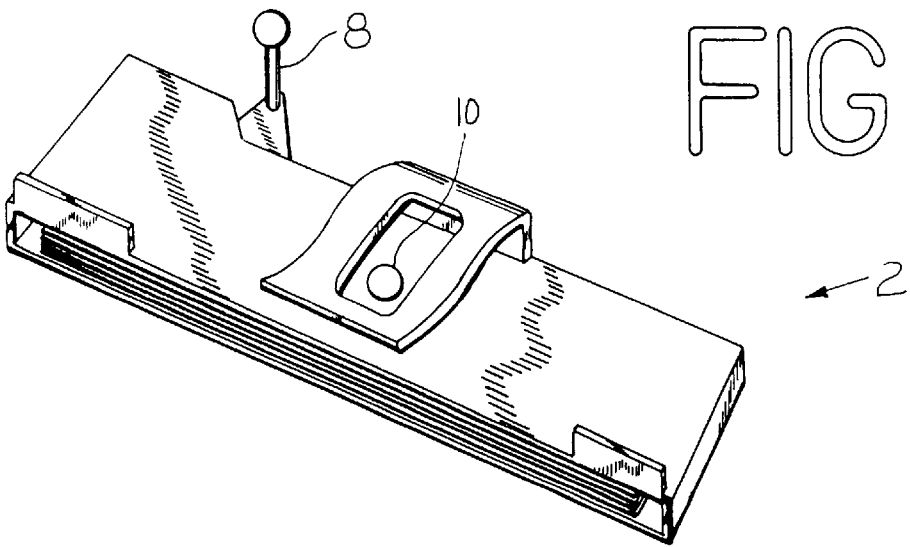

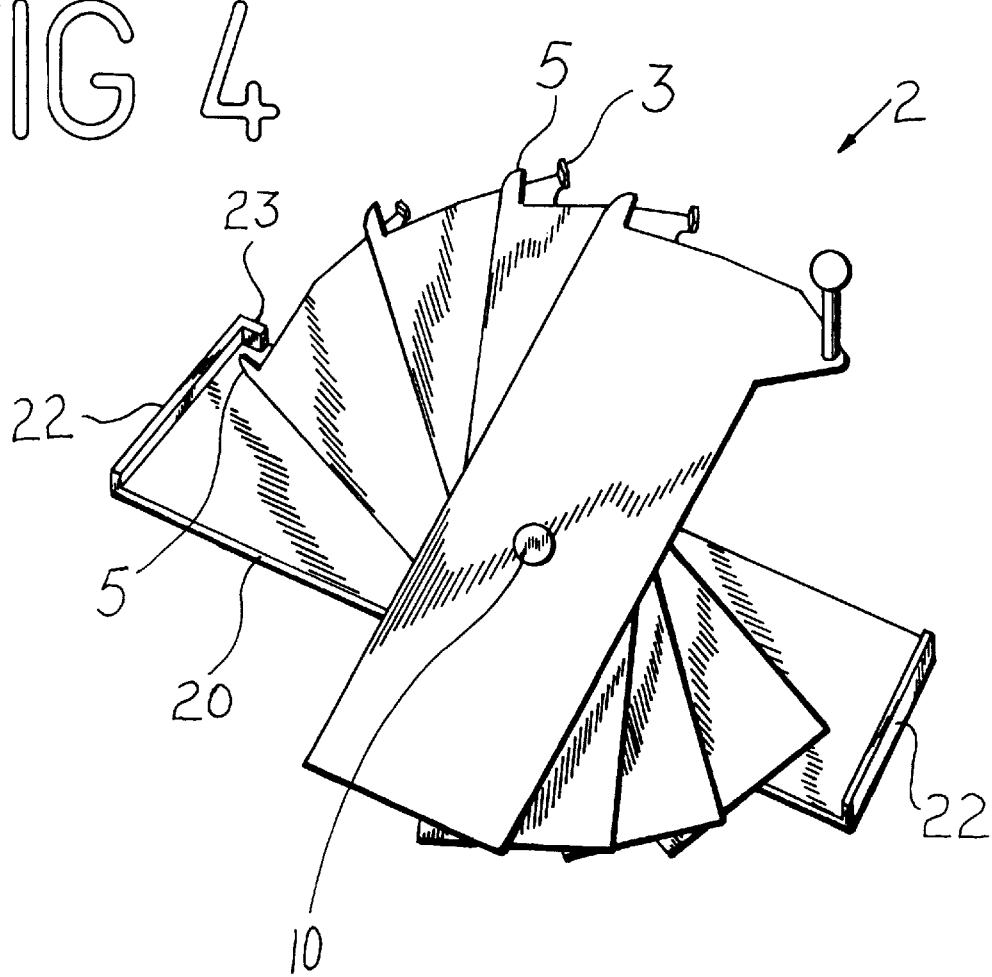

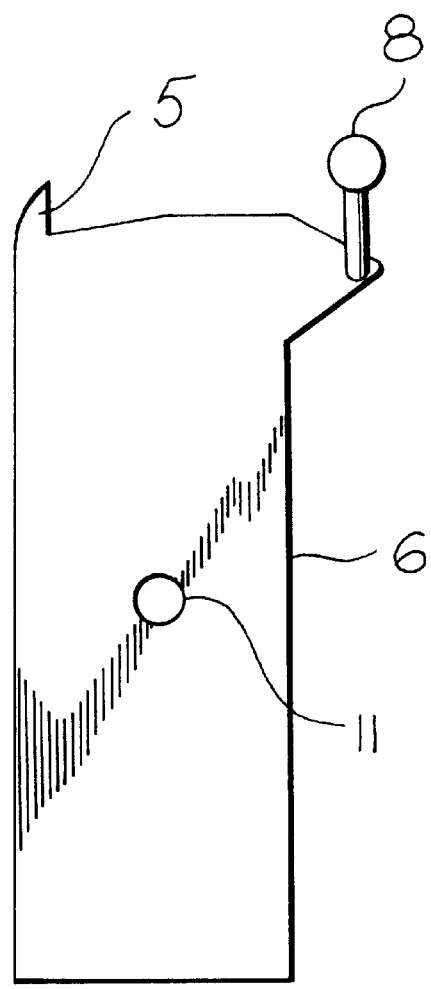
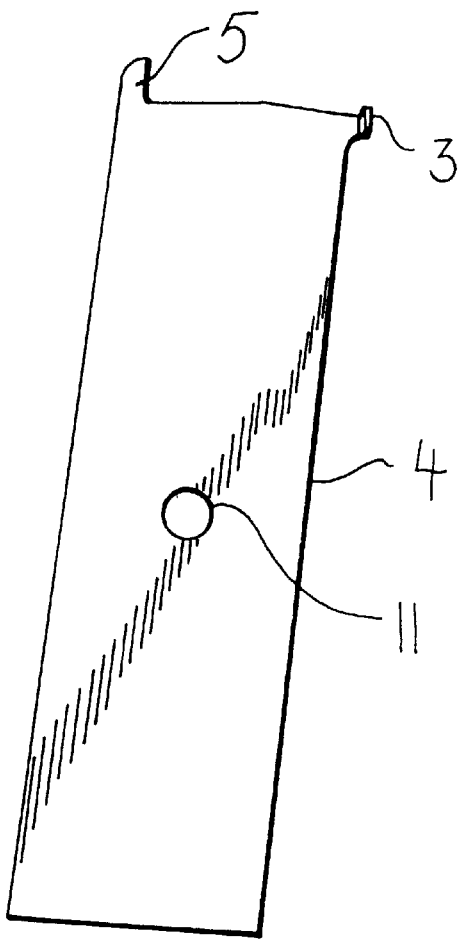
FIG 5
FIG 6

FOLDING BASE FOR A KICK STAND

This application claims benefit and priority of provisional patent application Ser. No. 60/076,329 filed Feb. 27, 1998.

BACKGROUND OF THE INVENTION

1. Field of the Invention

This invention relates to two-wheeled vehicle kick stands, and in particular to a folding base for a kick stand.

2. Background of the Invention

Motorcycles comprise an important part of our transportation system, and have been around for over a century. Gottlieb Daimler, a German engineer, is generally credited with inventing and building the first motorcycle in 1885. He mounted a four-stroke piston engine to a wooden bicycle frame. Following a few decades of development, the motorcycle became a reliable, useful vehicle during the early 1900's.

While today's motorcycles do not differ significantly in appearance from the early models, they do incorporate important improvements. Modern motorcycles have stronger frames, more powerful engines and more dependable brakes. Larger, softer seats make riding more comfortable, and hydraulic springs help lessen road shocks.

Bicycles were first introduced during the 1790's by Comte Mede to Sivrac of France, and were referred to as célérifères. Around 1816 Baron Karl von Drais of Germany invented an improved model incorporating a steering bar connected to the front wheel, and was called a draisine. A Scottish blacksmith, Kirkpatrick Macmillan, added foot pedals to the draisine in 1839. The first U.S. bicycle patent was granted Pierre Lallement, a French carriage maker, in 1866.

During the 1870's a new version of bicycle, called a high wheeler or penny-farthing, was introduced. This high wheeler featured a huge front wheel (as large as 5 feet in diameter) and a small rear wheel, with pedals directly attached to the hub of the large front wheel. Thus every turn of the pedal caused the bicycle to turn once, so the bike traveled a relatively long distance with each pedal turn.

Around 1890 J. K. Starley of England produced the first commercially successful safety bicycle. This bicycle had wheels of the same size, which rendered it safer than the huge front-wheeled high wheeler. The rear wheel was powered by pedals driving a chain on sprockets, as in modern bikes. The safety bicycle also incorporated air-filled rubber tires, a coaster brake and adjustable handle bars.

Thus, by the early 1900's the bicycle closely resembled today's bicycle, even including bicycle gear shifts. At the turn of the century, around 4 million Americans were riding bicycles regularly. With the advent of the automobile, however, interest in bicycles waned. Girls and boys continued to ride bikes to school, run errands, and perform many tasks in less time than in would take to walk. During World War II many people in the United States, Canada and other countries rode bicycles due to shortages of automobiles, gas and tires. After World War II, during the 1950's, a concern for health and physical fitness brought a new interest in bike riding, which continues today. Specialized forms of bikes such as mountain bikes and beach bikes continue to stir interest and to attract participants in these sports.

One refinement which has benefited motorcycles and bicycles is the kick stand. The kick stand allows a two-wheeled vehicle to be parked upright. This is accomplished by swinging the kick stand downwards (one extreme of the kick stand is pivotally attached to the frame of the two-wheeled vehicle), and resting the kick stand on the surface upon which the two-wheeled vehicle is disposed. Thus, when extended, the kick stand provides a third support point (the other two support points being the lowest part of the two wheels) for the two-wheeled vehicle.

There are several advantages associated with maintaining a two-wheeled vehicle upright when not in use. One advantage is the convenience of not having to stoop down and pick up the vehicle every time it is used. In fact, larger motorcycles may be so heavy that they may be difficult or impossible to erect by a single person once they fall over. Many motorcycle systems only work when the bike is upright, such as the carburetor and fuel tank—if a motorcycle is allowed to lie on its side, the fuel may leak out of the gas tank. In addition, if the motorcycle uses a liquid-filled battery, the battery acid may leak out of the battery, to the corrosive detriment of anything it touches. Modern motorcycles are designed to rest on their wheels and kickstands—their turn signal lamps and other accessories may be broken or scratched if the motorcycle is allowed to rest on its side.

Where a two-wheeled vehicle rests on a solid surface such as cement or asphalt, the modern kick stand works quite well. A serious problem emerges, however, where the two-wheeled vehicle stands on sand, dirt, grass, or other non-solid surface. In such case, the lower extreme of the kick stand tends to sink into the soft surface as driven by the weight of the two-wheeled vehicle, and the vehicle may topple over, causing the problems referred to above. Thus, preventing the kick stand from penetrating soft surfaces and consequently causing the two-wheeled vehicle to fall on its side has become a serious challenge.

SUMMARY OF THE INVENTION

Accordingly, it is an object of the present invention to provide a folding base for a kick stand which prevents the kick stand from sinking into a soft surface. Design features allowing this object to be accomplished include a plurality of panels pivotally attached to a housing. Advantages associated with the accomplishment of this object include reduced vehicle damage and increased convenience.

It is another object of the present invention to provide a folding base for a kick stand which is capable of folding into a compact size. Design features allowing this object to be accomplished include a plurality of panels pivotally attached to a housing. Benefits associated with the accomplishment of this object include easy storage and transportation of the folding base for a kick stand so as to make it readily available for use.

It is still another object of this invention to provide a folding base for a kick stand which is self-cleaning. Design features enabling the accomplishment of this object include a plurality of panels pivotally attached to a housing which wipe each other when the folding base for a kick stand is folded. Advantages associated with the realization of this object include reduced mess associated with the folding base for a kick stand as well as longer folding base for a kick stand life, especially where the folding base for a kick stand has been contaminated with corrosive matter such as salt water sand.

It is yet another object of this invention to provide a folding base for a kick stand which is economical. Design features allowing this object to be achieved include the use of components made of readily available materials. Benefits associated with reaching this objective include reduced cost, and hence increased availability.

BRIEF DESCRIPTION OF THE DRAWINGS

The invention, together with the other objects, features, aspects and advantages thereof, will be more clearly understood from the following in conjunction with the accompanying drawings.

Four sheets of drawings are provided. Sheet one contains FIG. 1. Sheet two contains FIGS. 2 and 3. Sheet three contains FIG. 4. Sheet four contains FIGS. 5 and 6.

FIG. 1 is a top isometric view of a folding base for a kick stand fully extended.

FIG. 2 is a top isometric view of a folding base for a kick stand, half-way retracted.

FIG. 3 is a top isometric view of a folding base for a kick stand fully retracted.

FIG. 4 is a top cross-sectional view of a folding base for a kick stand taken at section IV—IV of FIG. 2.

FIG. 5 is a top isometric view of a panel.

FIG. 6 is a top isometric view of an end panel.

DETAILED DESCRIPTION OF THE PREFERRED EMBODIMENT

FIG. 1 is a top isometric view of folding base for a kick stand 2 fully extended. Folding base for a kick stand 2 comprises a number of panels 4 and an end panel 6 rotatably attached to housing 16 by means of spindle 10. Housing 16 comprises housing aperture 24 bounded by housing lower deck 20, housing side walls 22 and housing upper deck 18. Housing upper deck 18 comprises housing upper deck walls 14 disposed along one edge of upper deck 18, and clip 12 disposed on an edge of upper deck 18 opposite upper deck walls 14.

Clip 12 is sized to frictionally admit kick stand foot 32, which is the lower end of kick stand leg 30. Housing upper deck walls 14 aid in maintaining folding base for a kick stand 2 securely clipped to kick stand foot 32. Clip 12 is made of resilient material which permits folding base for a kick stand 2 to be quickly and easily clipped onto, and removed from, kick stand foot 32.

Housing aperture 24 is sized to admit all panels 4 and end panel 6 when folding base for a kick stand 2 is in the fully retracted configuration, as depicted in FIG. 3. FIG. 2 is a top isometric view of folding base for a kick stand 2, half-way retracted. Folding base for a kick stand 2 is retracted by moving handle 8, which is attached to end panel 6, and by rotating all panels 4, in the direction indicated by arrow 26 in FIG. 2, until all panels 4 and end panel 6 are disposed within housing aperture 24. When fully retracted, folding base for a kick stand 2 may be easily transported or stored, due to its compact size.

It is important to note that as folding base for a kick stand 2 is retracted, panels 4 and end panel 6 are disposed immediately adjacent each other, and thus scrape against each other during retraction. This scraping action serves the valuable function of cleaning mud, dirt, sand, or other contamination from panels 4 and end panel 6 during retraction, thus rendering folding base for a kick stand 2 clean for storage and/or transportation.

As may be observed in FIG. 4, housing 16 further comprises housing stop 23 which serves to limit the rotational movement of the first panel 4 adjacent housing lower deck 20 relative to housing 16. In the preferred embodiment, panels 4 and end panel 6 are arranged in a stack, with the first panel 4 at one end of the stack and end panel 6 at the opposite end of the stack, and the first panel 4's extension is limited by its panel tongue 5 butting up against housing stop 23.

FIG. 5 is a top isometric view of panel 4. Each panel 4 comprises panel tongue 5, panel stop 3, and spindle bore 11 sized to admit spindle 10. FIG. 6 is a top isometric view of end panel 6. End panel 6 comprises panel tongue 5, handle 8 and spindle bore 11 sized to admit spindle 10.

Folding base for a kick stand 2 is extended by moving handle 8 in a direction opposite arrow 26. As end panel 6 fully extends, its panel tongue 5 butts against the panel stop 3 of the panel 4 adjacent end panel 6, and causes the panel 4 adjacent end panel 6 to extend. As each succeeding panel 4 fully extends, its panel tongue 5 engages the next panel 4's panel stop 3, thus causing the next panel 4 to also extend.

Folding base for a kick stand 2 is fully extended when all panel tongues 5 are butted against their respective panel stops 3, and the panel tongue 5 of first panel 4 closest housing lower deck 20 is butted against housing stop 23. See FIGS. 4–6.

While a preferred embodiment of the invention has been illustrated herein, it is to be understood that changes and variations may be made by those skilled in the art without departing from the spirit of the appending claims.

DRAWING ITEM INDEX 2 folding base for a kick stand
3 panel stop
4 panel
5 panel tongue
6 end panel
8 handle
10 spindle
11 spindlebore
12 clip
14 upper deck wall
16 housing
18 housing upper deck
20 housing lower deck
22 housing side wall
23 housing stop
24 housing aperture
26 arrow
30 kick stand leg
32 kick stand foot

We claim:

1. A folding base for a kick stand comprising a plurality of panels rotatably attached to a housing by means of a spindle, and an end panel rotatably attached to a housing by means of said spindle, said housing comprising a housing aperture sized to admit said panels and said end panel, said housing also comprising a housing upper deck sized to accommodate a vehicle kick stand foot, whereby said panels and said end panel may be alternately extended into an open configuration for use as a kick stand base, or retracted into said housing aperture for storage and/or transportation, said spindle being substantially centrally disposed relative to said panels and to said housing, whereby an action of extending said panels into said open configuration orients said panels into two substantially coplanar, back-to-back fans, each said fan spanning an arc of approximately 180 degrees.

2. The folding base for a kick stand of claim 1 wherein each said panel comprises a panel stop and a panel tongue disposed so as to engage said panel stop of an adjacent said panel when each said panel is rotated about said spindle relative to said housing into an extended position, and wherein said end panel comprises a panel tongue disposed so as to engage said panel stop of a panel adjacent said end panel when said panel adjacent said end panel is rotated about said spindle relative to said housing into an extended position, thereby permitting all said panels to be extended by extending said end panel.

3. The folding base for a kick stand of claim 2 wherein said housing further comprises a housing stop disposed so as to engage the panel tongue of the said panel adjacent said housing stop, thereby limiting an extension of said panels and said end panel into a circular-shaped configuration, thus maximizing the effectiveness of the folding base for a kick stand in preventing a vehicle whose kick stand rests on said folding base for a kick stand from falling over due to a soft surface upon which said vehicle rests.

4. The folding base for a kick stand of claim 3 wherein said end panel further comprises a handle whereby said end panel may be rotated relative to said housing, thus permitting said folding base for a kick stand to be easily extended and retracted.

5. The folding base for a kick stand of claim 1 wherein said housing upper deck comprises a clip disposed on one edge and at least one upper deck wall disposed on an opposite edge, said clip sized to frictionally admit a kick stand foot, whereby a kick stand foot may be securely held on said housing upper deck by means of said clip and said at least one housing upper deck wall.

6. A folding base for a kick stand of claim comprising:
   a plurality of panels and an end panel disposed in a panel stack, said end panel being disposed at one end of said panel stack, a first panel being disposed at an opposite end of said stack from said end panel, each said panel and said end panel having a spindle bore;
   a housing comprising a housing upper deck, housing side walls disposed at opposite edges of said housing upper deck, and a housing lower deck rigidly attached to edges of said housing side walls opposite said housing upper deck, said housing upper deck, housing side walls and housing lower deck defining a housing aperture, said housing aperture sized to admit said panel stack; and
   a spindle disposed through said spindle bores, one end of said spindle being attached to said housing lower deck and an opposite end of said spindle being attached to said housing upper deck, said spindle being substantially centrally disposed relative to said panels and to said housing, whereby an action of extending said panels into said open configuration orients said panels into two substantially coplanar, back-to-back fans, each said fan spanning an arc of approximately 180 degrees.

7. The folding base for a kick stand of claim 6 wherein each said panel comprises a panel stop and a panel tongue disposed so as to engage said panel stop of an adjacent said panel when each said panel is rotated about said spindle relative to said housing into an extended position, and wherein said end panel comprises a panel tongue disposed so as to engage said panel stop of a panel adjacent said end panel when said panel adjacent said end panel is rotated about said spindle relative to said housing into an extended position, thereby permitting all said panels to be extended by extending said end panel.

8. The folding base for a kick stand of claim 7 wherein said housing farther comprises a housing stop disposed so as to engage the said panel tongue of said first panel, thereby limiting an extension of said panels and said end panel into a circular-shaped configuration, thus maximizing the effectiveness of the folding base for a kick stand in preventing a vehicle whose kick stand rests on said folding base for a kick stand from falling over due to a soft surface upon which said vehicle rests.

9. The folding base for a kick stand of claim 8 wherein said housing upper deck comprises a clip disposed on one edge and at least one upper deck wall disposed on an opposite edge, said clip sized to frictionally admit a kick stand foot, whereby a kick stand foot may be securely held on said housing upper deck by means of said clip and said at least one housing upper deck wall.

10. The folding base for a kick stand of claim 9 wherein said end panel further comprises a handle whereby said end panel may be rotated relative to said housing, thus permitting said folding base for a kick stand to be easily extended and retracted.

* * * * *